United States Patent Office 2,792,834
Patented May 21, 1957

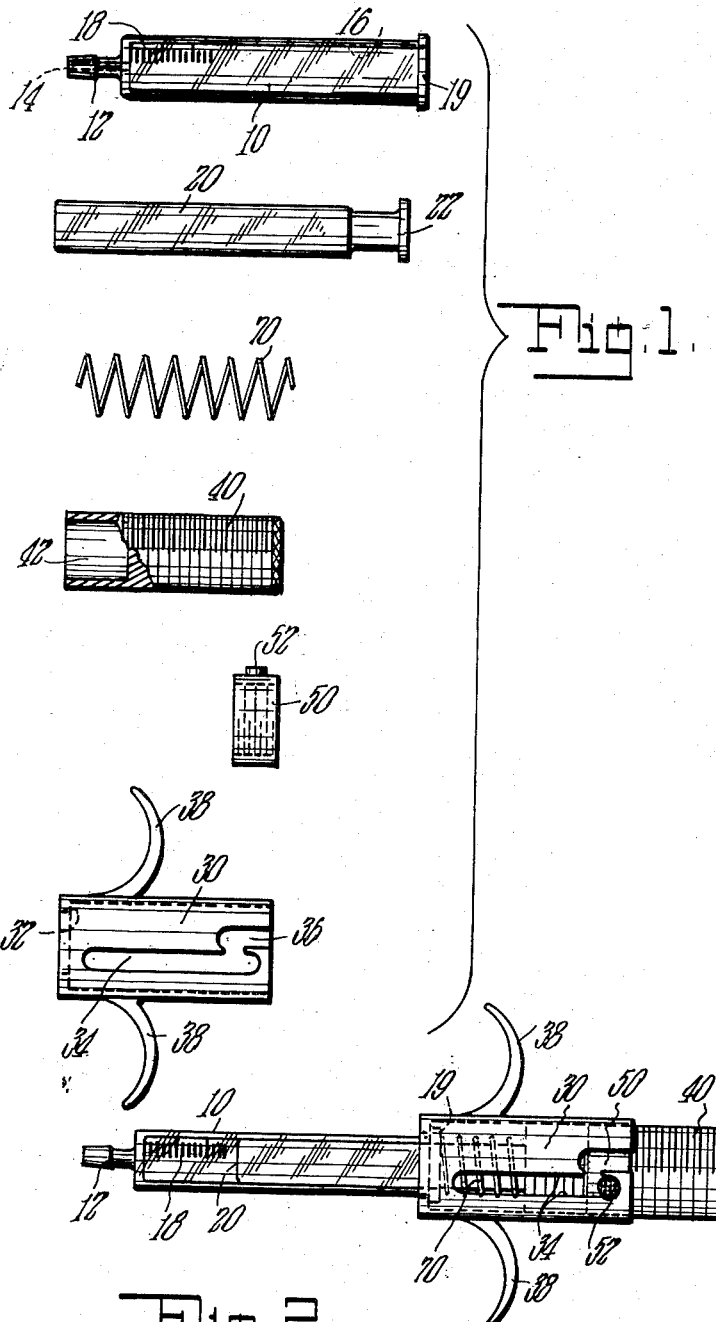

2,792,834

OPERATING DEVICE FOR SYRINGE OR PIPET

Leon Kapelsohn, Bronx, N. Y., assignor, by mesne assignments, to Scientific Industries, Inc., Springfield, Mass., a corporation of Delaware Application September 22, 1955, Serial No. 536,006

3 Claims. (Cl. 128—218)

My invention relates to new and useful improvements in a syringe or pipette and is directed more particularly to an improvement in the means for accurately measuring successive doses of liquid ejected therefrom and in the means for accurately bringing a piston or plunger to a predetermined setting within a cylinder.

It is the principal object of my invention to provide a novel construction of the type in which adjusting means is afforded for the purpose of accurately and automatically measuring doses of liquid. There is the further provision of a simple structure made up of a few easily separable parts which will eliminate the now present objectionable inconveniences and which will operate with great ease and with slight effort.

Another one of the primary purposes of my invention is to provide structural and operational improvements in devices of the class to which reference has been made, which improvements not only simplify the structure as such, but also provide important distinct advantages in durability, efficiency, additional uses, and the like.

In the operation of prior art pipettes, the operator measures, as by placing the tip of the pipette into the liquid and by moving the plunger to draw the liquid into the cylinder. In dispensing measured quantities of the liquid, he presses the plunger so as to force the liquid through the tip of the pipette. He gauges the amount of liquid by noting a scale on the glass cylinder of the instrument.

This procedure involves some difficulties in that the operator must closely observe the movement of the piston or plunger and must start and stop the movement thereof at exact positions, which procedure is quite difficult and is usually inaccurate because it requires the operator's close attention to the cylinder. This is undesirable as it is often necessary to observe other factors during the injection operation, all to the neglect of the pipette and the functioning thereof.

This invention is intended to overcome the difficulties and disadvantages inherent in devices of the type above described, it being among other objects hereof to provide an attachment to a syringe or pipette or the like which can be accurately set to measure automatically doses of liquid to be injected therewith and further to provide adjustable means for this purpose whereby the device may be used for injection of varying amounts of liquid.

This invention is also intended to overcome the difficulties and disadvantages heretofore occurring when syringes were used as devices to fill micro pipettes. This invention provides a much finer degree of control of the movement of the plunger than was heretofore possible so as to provide means for drawing very small quantities of liquid precisely to the desired mark or level on such micro pipettes.

Other prime objects of my invention include; first, the securement of a higher degree of accuracy and greater degree of variety in the manner of work performed therewith than has heretofore been possible with prior devices known in the art; second, the attainment of a higher speed of construction and assembly and repair of the device due to its simplification of design and its unique composition of parts; third, the attainment of a flexibility or a capability of adjustment by which a large variety of work can be produced by means of the same device; fourth, the provision of an improved construction which may be made more economically and with fewer operations in the manufacture of its parts, as well as in the assembly of the same, than prior devices known in the art; fifth, the provision of a construction which may be readily installed with respect to the various purposes for which it is intended; sixth, the provision of a construction which permits the use of a syringe of any composition including the all glass type which is most popular; and seventh, the provision of such other improvements in and relating to syringes of the type above referred to as are hereinafter described and claimed.

With the above primary objects in view, it is another object of the invention to provide a construction of the above described character which is not only distinctive in its appearance and practical in its value but also reliable in its operation and efficient in its use.

It is still further object to provide a device which is constructed of relatively simple parts which are adapted to be readily assembled and which when once assembled are securely retained in operative relationship and which cannot be accidentally separated from each other but yet which can very rapidly and simply be separated from each other at will.

With the foregoing and various other and ancillary features and advantages and objects as will become apparent as the description proceeds, my invention consists in certain features of novelty, in a mode of operation, and in the combination, organization, and arrangement of parts as will be hereinafter more particularly pointed out in the claims hereunto annexed and more fully described and referred to in conjunction with the accompanying drawing wherein:

Fig. 1 is a side elevational view of each of the components of the syringe of my invention, and Fig. 2 is a side elevational view of the device of the invention showing the components, in their assembled relation.

In the following description and claims, various details will be identified by specific names for convenience. These names however are intended to be as generic in their application as the art will permit.

Referring now to the drawing more in detail, in which similar characters of reference indicate corresponding parts in the two figures, I have shown the components of the invention in a more or less exploded view in Fig. 1 in order that the general relation and utility of the device may be better understood.

The syringe or pipette consists of the conventional cylinder or body 10 which is usually of glass or the like. The pipette has a lower neck portion 12 having a fine opening 14 extending therethrough affording communication between the hypodermic needle (not shown) or the like which may be fitted thereto and the hollow interior 16 of the body 10.

The body 10 carries indicia 18 by means of which measurements may be made in the well known manner.

The upper end of the body 10 is provided with an annular shoulder or flange 19.

A plunger or piston 20 is adapted to fit closely within the body 10 and to be slidable relative thereto so as to extend upwardly therefrom in varying degrees.

A cylindrical sleeve member 30 of greater diameter than the body 10 has an inwardly extending annular rim 32 forming a shoulder at the lower end thereof upon which the shoulder or flange 19 of the body 10 may seat when the components are assembled.

If desired, a soft resilient washer or the like may be interposed between said members so as to function as a cushion and to prevent breakage of the glass body member 10.

The sleeve member 30 is provided with an elongated slot 34 having an offset 36 at the outer open end thereof as shown and may also be provided with a pair of finger holds 38 to facilitate handling and operation all as will be shortly observed.

An externally threaded operating member 40 is provided which is receivable within the sleeve member 30. An internally threaded ring member 50 is threadedly engageable with the operating member 40 and carries an outwardly extending pin 52 which is receivable in the slot 34—36 when the member 40 is introduced into the member 30.

With the pin in the slot 34—36, the ring member 50 may be prevented from turning and the member 40 may be moved inwardly or outwardly relative to the member 30 merely by holding the sleeve member in the hand and by manually rotating the operating member 40.

If desired, in the case of larger sizes of syringes, a pair of slots 34 on opposite sides of the member 30 may be provided.

The inner end of the member 40 is provided with an opening 42 into which the outer flange or shoulder 22 of the plunger 20 may be inserted.

A spring member 70 is disposed around the plunger 20 between the flange 19 of the body 10 and the flange 22 of the plunger 20 when the components are assembled, whereby the plunger is receivable in the bore of the body 10 and the plunger is receivable in the opening 42 of the operating member 40 as shown.

If desired a cap or cover member, not shown, may be provided so as to enclose the outer end of the operating member whereby the threads thereof may be concealed from view.

In operation, the operating member may be adjusted to various positions relative to the sleeve member so as to control the length of the stroke of the plunger within the cylinder or body member.

The liquid is filled in the lower part of the cylinder or body member. Pressure is then applied to the operating member by the thumbs of the operator whose forefinger and middle finger embrace the finger holds on the sleeve member. The operator's pressing on the operating member causes ejection of the liquid through the opening 14 until the plunger contacts the bottom of the interior of the body member.

The stroke can be adjusted as aforesaid.

For use with micro pipettes, the pipette would be fastened to the tip 12 of the barrel 10 by a suitable means well known in the art, such as heavy plastic tubing. With the tip of the pipette immersed in the liquid to be measured, the threaded member 40 would be rotated slowly so as to raise the plunger 20. This would draw the liquid into the micro pipette slowly and under such close control that the liquid could be accurately brought exactly to the calibration mark of the pipette. Ejection from the pipette could be obtained by simply grasping the members 38 or the bottom of the sleeve 30 and by pressing the member 40.

While I have illustrated and described the invention as embodied in a specific arrangement, I do not intend to be limited to the details shown since various modifications and structural changes may be made without departing in any way from the spirit of the invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalency of the claims below.

What it is desired to claim and secure by Letters Patent of the United States is:

1. A syringe comprising, a cylindrical hollow body, a plunger adapted to slide in said body and having an outer end portion extending outwardly from one end thereof, a sleeve surrounding said body and being slidable relative thereto, the extending portion of said plunger being within said sleeve, an operating member being engageable with said plunger, spring means surrounding said plunger within said sleeve between said body and said operating member, a longitudinal slot in said sleeve, a ring member threadedly engaged with said operating member, and a stud extending outwardly from said ring member and being in register with the slot in said sleeve whereby adjustment of the length of travel of said operating member within said sleeve and of said plunger within said body is obtainable.

2. A syringe comprising a cylindrical hollow body, a plunger adapted to slide in said body and extending outwardly from one end thereof, a sleeve, said body being engageable with said sleeve, the extending portion of said plunger being within said sleeve, an operating member being engageable with said plunger, spring means surrounding said plunger within said sleeve between said body and said operating member, a longitudinal slot in said sleeve, a ring member threadedly engaged with said operating member, a stud extending outwardly from said ring member and being in register with the slot in said sleeve affording adjustment of the length of travel of said operating member and plunger relative to said body.

3. A syringe comprising, a hollow body, a plunger adapted to slide in said body, a slotted sleeve being engageable with said body, an operating member being engageable with said plunger, spring means surrounding said plunger within said sleeve between said body and said operating member, a ring member threadedly engaged with said operating member, and a stud extending outwardly from said ring member and being in register with the slot in said sleeve, all adapted and arranged whereby upon the adjustment of said ring member relative to said operating member the length of travel of said plunger within said body is controlled.

References Cited in the file of this patent

UNITED STATES PATENTS

| | | |
|---|---|---|
| 2,283,915 | Cole | May 26, 1942 |
| 2,660,342 | Ruf | Nov. 24, 1953 |
| 2,705,494 | Broadwin | Apr. 5, 1955 |
| 2,706,480 | Nensel | Apr. 19, 1955 |

FOREIGN PATENTS

| | | |
|---|---|---|
| 756,530 | France | Sept. 25, 1933 |
| 44,329 | France | Oct. 1, 1934 |
| | (Addition to No. 756,530) | |